Nov. 3, 1970   H. B. SCHEIFELE   3,537,766
ROLLER BEARING CAGE AND ROLLER UNIT AND SPACER THEREFOR
Filed Jan. 2, 1969

INVENTOR
HUDSON B. SCHEIFELE

BY Barthel & Bugbee
ATTORNEYS

United States Patent Office 3,537,766
Patented Nov. 3, 1970

3,537,766
ROLLER BEARING CAGE AND ROLLER UNIT
AND SPACER THEREFOR
Hudson B. Scheifele, Franklin, Mich., assignor to Aetna
Bearing Company, a division of Textron, Inc., Chicago,
Ill., a corporation of Rhode Island
Filed Jan. 2, 1969, Ser. No. 788,461
Int. Cl. F16c 33/46
U.S. Cl. 308—217                        7 Claims

ABSTRACT OF THE DISCLOSURE

This roller bearing cage and roller unit consists of axially-spaced end rings containing aligned circumferentially-spaced rounded wedge-shaped holes receiving the correspondingly rounded wedge-shaped opposite end shanks of bearing roller spacers having outer and inner roller-contacting portions of trapezoidal cross-section converging toward and interconnected by a narrower intermediate portion also of trapezoidal cross-section which in turn converges from the outer portion toward the inner portion, and which terminates at its opposite ends in said shanks. These outer and inner portions have roller-contacting side surfaces which converge toward one another at different included angles, and the radii drawn to their contact points on the rollers make different angles with the line of centers extending between the axes of adjacent rollers. This rounded wedge-shaped cross-section of the holes and shanks prevents assembly of the spacers upside down and provides maximum strength and resistance to twisting, because of the great widths of the flat tapering sides with respect to the thicknesses of the shanks.

Figure 1:
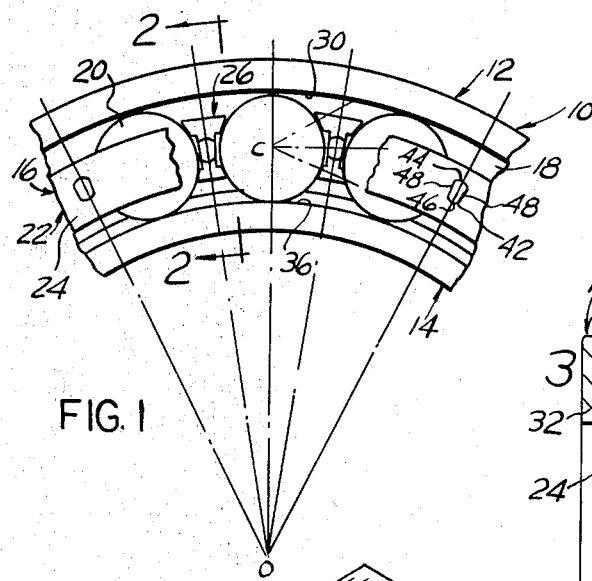
FIG. 1 is a radial circumferential section through a portion of the outer and inner races of a cylindrical roller bearing equipped with the roller bearing cage of the present invention, shown in side elevation with portions broken away to reveal two adjacent spacers.
Figure 2:
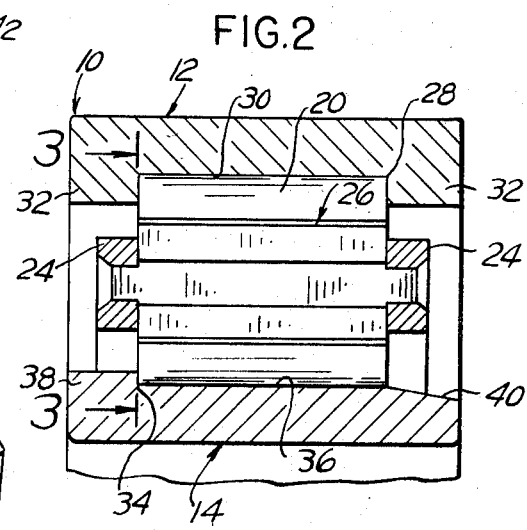
FIG. 2 is an enlarged radial cross-section taken along the line 2—2 in FIG 1.

Referring to the drawings in detail, FIGS. 1 and 2 show a portion of a roller bearing assembly, generally designated 10, including an outer race 12, an inner race 14 rotatable relatively thereto during operation, and a roller bearing cage and roller unit, generally designated 16, occupying the annular space 18 between the outer and inner races 12 and 14. The cage and roller unit 16 consists of circumferentially-spaced cylindrical rollers 20 held in assembly by a roller bearing cage, generally designated 22, which in turn consists of a pair of flat end rings 24 spaced axially apart from one another by spacers or cross bars, generally designated 26, shown in enlarged cross-section and perspective in FIGS. 3 and 4 respectively.

The outer race 12 is provided with an internal annular groove 28 (FIG. 2) providing a cylindrical roller path 30 and has opposite inwardly-extending end flanges 32 which limit axial end motion of the bearing rollers 20. The inner race 14 has an external annular rabbet 34 providing a roller path 36 terminating at one end in outwardly-extending flange 38 and at its opposite end with a flared or conical surface 40 without any flange in order to permit assembly and disassembly of the roller bearing assembly 10 by sliding the inner race 14 axially relatively to the outer race 12.

Each end ring 24 (FIG. 1) is provided with a multiplicity of circumferentially-spaced holes 42 disposed at equal intervals therearound for both end rings 24 so that in assembly the holes 42 of the two end rings 24 are aligned axially with one another. Each hole 42 has arcuate concentric outer and inner surfaces 44 and 46 respectively and inwardly-converging flat opposite sides 48. These holes 42 are conveniently punched or broached.

Each spacer or cross bar 26 consists of outer, intermediate and inner portions 50, 52 and 54 respectively (FIG. 3), each of approximately trapezoidal cross-section. The opposite flat sides 56 of the outer portion 50 taper inwardly from their outer sides 58 to junction shoulders 60 with the widest part of the intermediate portion 52, whereas the flat sides 62 of the inner portion 54 taper outwardly from their inner sides 64 to junction shoulders 66 with the narrowest part of the intermediate portion 52. The opposite ends of the intermediate portion 52 project axially beyond the ends of the outer and inner portions 50 and 54 to provide reduced-sized shanks 68. The shanks 68 have arcuate cylindrical outer and inner surfaces 70 and 72 respectively concentric with one another at their common center 74 and have flat opposite sides 76 which converge from the wider outer surface 70 to the narrower inner surface 72, matching the configuration of the holes 42 in the end ring 24 so as to be insertable therein. The thus wedge-shaped shanks 68 fitting the correspondingly wedge-shaped holes 42 permit the assembly of the spacers 26 and end rings 24 in only one way, thus preventing upside-down assembly. At the same time, the rounded partially-cylindrical outer and inner surfaces 70 and 72 are conveniently formed by turning operations, such as in an automatic screw machine. The corner portions adjacent their junction lines 78 and 80 with the converging flat sides 76 also possess greater strength with less danger of forming cracks at the corresponding points in the edges of the holes 42 because of the greater angles subtended between the tangents to the surfaces 70 and 72 at the points 78 and 80 and the flay sides 76, than would the more acute-angled corner portions which would be formed between flat outer and inner surfaces (not shown) and the flat side surfaces 76.

Figure 3:
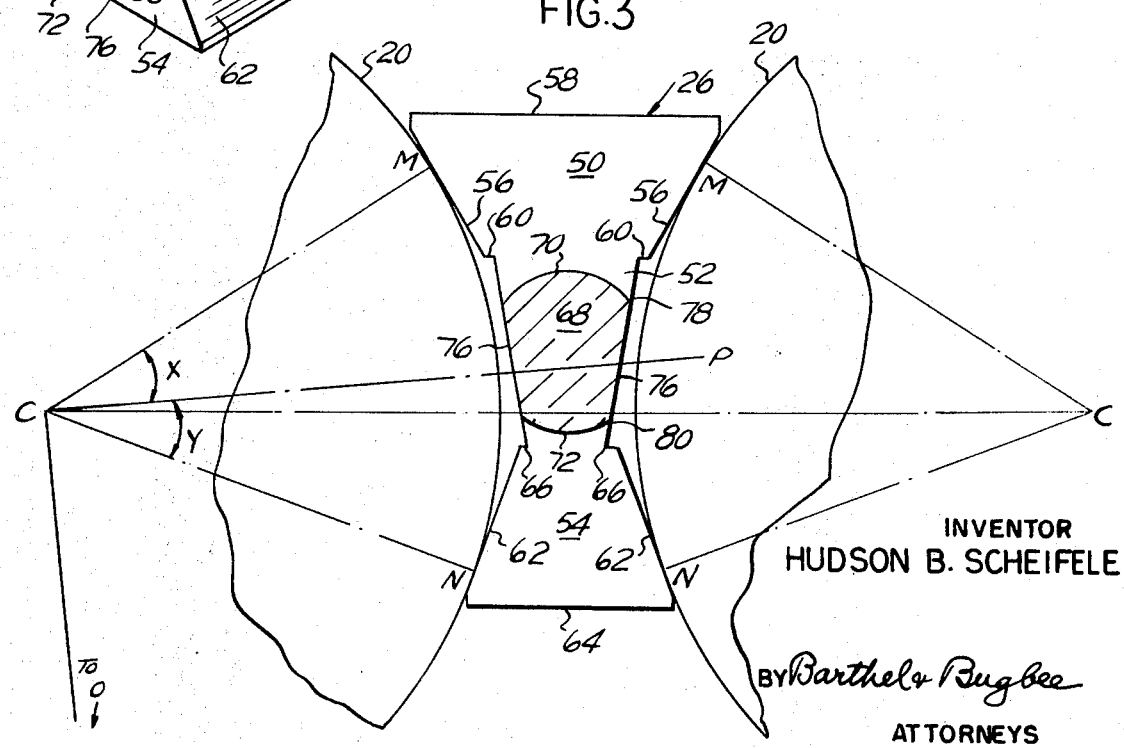
FIG. 3 is a further enlarged section taken along the line 3—3 in FIG. 2.

The geometry of the roller bearing assembly 10 is shown in FIG. 3 where O is the common center of the outer and inner roller paths 30 and 36, C is the center of each roller 20 in the bearing cage and roller unit 16, M and N are the points of contact of each roller 20 with the side surfaces 56 and 62 of the outer and inner portions 50 and 54 respectively, and CP is a line drawn perpendicular to the radius OC. The angle MCP designated X in FIG. 3 is greater than the angle NCP, designated Y therein. This is the case because the sides 56 of the upper portion 50 converge at a greater included angle than the sides 62 of the lower portion 54.

Figure 4:
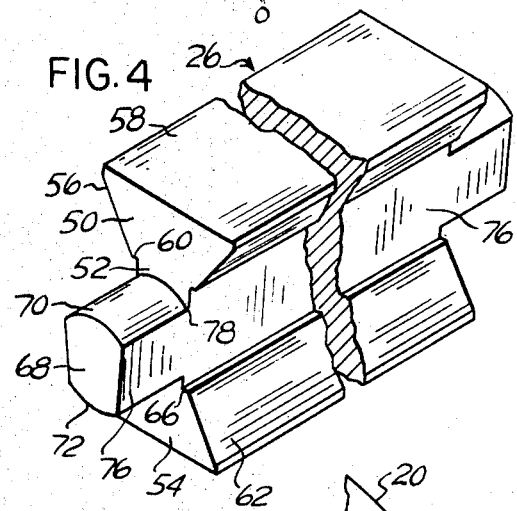
FIG. 4 is a perspective view of one of the spacers shown in FIGS. 1, 2 and 3 with the central portion broken away to conserve space.

The spacers or cross bars 26 are produced in the form of elongated bars preferably by means of rolling or extruding operations to produce the cross-sectional shape shown in FIGS. 3 and 4. These bars form elongated blanks which are subsequently cut to proper length, turned to produce the shanks 68 of wedge-shaped cross-section, and finally cut off, these operations being performed preferably by automatic screw machine operations.

In the assembly of the cage and roller units 16, an end ring 24 with its holes 42 is caused to receive a full set of the spacers or cross bars 26 by inserting the shanks 68 at one end of each spacer 26 in one of the holes 42, the ends of each shank being upset as in riveting. An outer race 12 is then mounted in a horizontal position and a full complement of rollers 20 is then inserted, with their axes vertical, in the groove 28 against the roller path 30 thereof. The above-described partial assembly of the spacers 26 secured at one end thereof to the one of the end rings 24 is then pushed downward into the central portion of the outer race 12 with the spacers 26 separating the respective rollers 20. The second end ring 24 is then mounted with its holes 42 receiving the exposed shanks 68, the ends of which are then upset, as by riveting, to complete the assembly of the cage and roller unit 16. The inner race 14, with its flared portion 40 facing downward, is then pushed into the central portion of the cage and roller unit 16 so that the rollers 20 also come into engagement with the inner roller path 36. The roller bearing assembly 10 is then in its completely assembled condition.

I claim:
1. A roller bearing cage and roller unit, comprising:
  a pair of end rings disposed in axially-spaced coaxial relationship and having a multiplicity of circumferentially-spaced holes or rounded wedge-shaped cross-section disposed in alignment with one another,
  a multiplicity of spacers extending between said end rings in alignment with said holes,
    each of said spacers comprising a body including an outer portion, an intermediate portion and an inner portion,
      said outer portion having flat sides converging inwardly to an outer junction with said intermediate portion,
      said inner portion having flat sides converging outwardly toward an inner junction with said intermediate portion spaced inwardly away from said outer junction,
      said intermediate portion having flat sides converging inwardly from said outer junction to said inner junction,
    said body having opposite end shanks of rounded wedge-shaped cross-section seated in said holes in mating relationship therewith,
  and a multiplicity of cylindrical bearing rollers disposed in circumferentially-spaced relationship in the intervals between said spacers in rolling line contact with said outer and inner portion sides and spaced away from said intermediate portion sides.

2. A roller bearing cage and roller unit, according to claim 1, wherein the rounded portions of said holes and of said end shanks have concentric cylindrical surfaces.

3. A roller bearing cage and roller unit, according to claim 2, wherein said cylindrical surfaces are spaced away from said junctions.

4. A roller bearing cage and roller unit, according to claim 1, wherein said junctions have shoulders thereat extending from the sides of said outer and inner portions to the sides of said intermediate portions.

5. A roller bearing cage and roller unit, according to claim 1, wherein the sides of said intermediate portions converge inwardly toward the axis of said end rings.

6. A roller bearing cage and roller unit, according to claim 1, wherein said end shanks project axially beyond said end rings and have enlarged end portions retainingly engaging said end rings.

7. A roller bearing cage and roller unit, according to claim 1, wherein the sides of said outer portion converge with a greater included angle therebetween than the angle of convergence of the sides of said inner portion.

References Cited

UNITED STATES PATENTS 3,365,255   1/1968   Altson _____ 308—217

FRED C. MATTERN, Jr., Primary Examiner

F. SUSKO, Assistant Examiner